United States Patent [19]

Mart

[11] 4,332,190

[45] Jun. 1, 1982

[54] SPIRAL MEAT SLICER

[75] Inventor: Clyde D. Mart, Beachwood, Ohio

[73] Assignee: First National Supermarkets, Inc., Maple Heights, Ohio

[21] Appl. No.: 156,254

[22] Filed: Jun. 3, 1980

[51] Int. Cl.[3] ........................ A23N 7/00; B23D 19/00

[52] U.S. Cl. ........................................ 99/538; 83/478; 99/537; 99/593; 99/594; 99/597

[58] Field of Search ................. 99/537, 538, 593, 594, 99/567; 83/451, 471.2, 483, 488, 703, 704, 478, 544-546, DIG. 1; 308/4 C, 7, 6 A, 6 B, 6 R; 248/123.1, 125; 74/89.15, 529, 536, 613, 616

[56] References Cited

U.S. PATENT DOCUMENTS

| | | | |
|---|---|---|---|
| 617,332 | 1/1899 | Glazier | 74/613 |
| 1,828,089 | 10/1931 | Shaw | 73/613 |
| 2,926,709 | 3/1960 | Kaley | 83/478 |
| 3,194,611 | 7/1965 | Mahony | 308/6 B |
| 3,951,054 | 4/1976 | Frentzel | 99/537 |
| 4,287,820 | 9/1981 | Urban | 99/538 |

*Primary Examiner*—Philip R. Coe
*Assistant Examiner*—Timothy F. Simone
*Attorney, Agent, or Firm*—Isler and Ornstein

[57] ABSTRACT

A spiral meat slicer or ham slicer is disclosed in which a rotating circular or disk like blade is brought into contact with a rotating ham for the purpose of slicing the ham. Means are provided for causing the blade to be moved axially in relation to the axis of the ham, and for canting the axis of rotation of the blade slightly in relation to the axis of rotation of the ham, whereby to form a single continuous spiral slice from the whole ham. Means are also provided for preventing exposure of the blade when not in use, whereby to avoid injury to the operator of the slicer and others. Additional means are also provided for stabilizing the operation of the cutter or slicer unit, whereby greater efficiency in operation and use of the device, as well as an improved product, is attained.

4 Claims, 16 Drawing Figures

Fig. 6
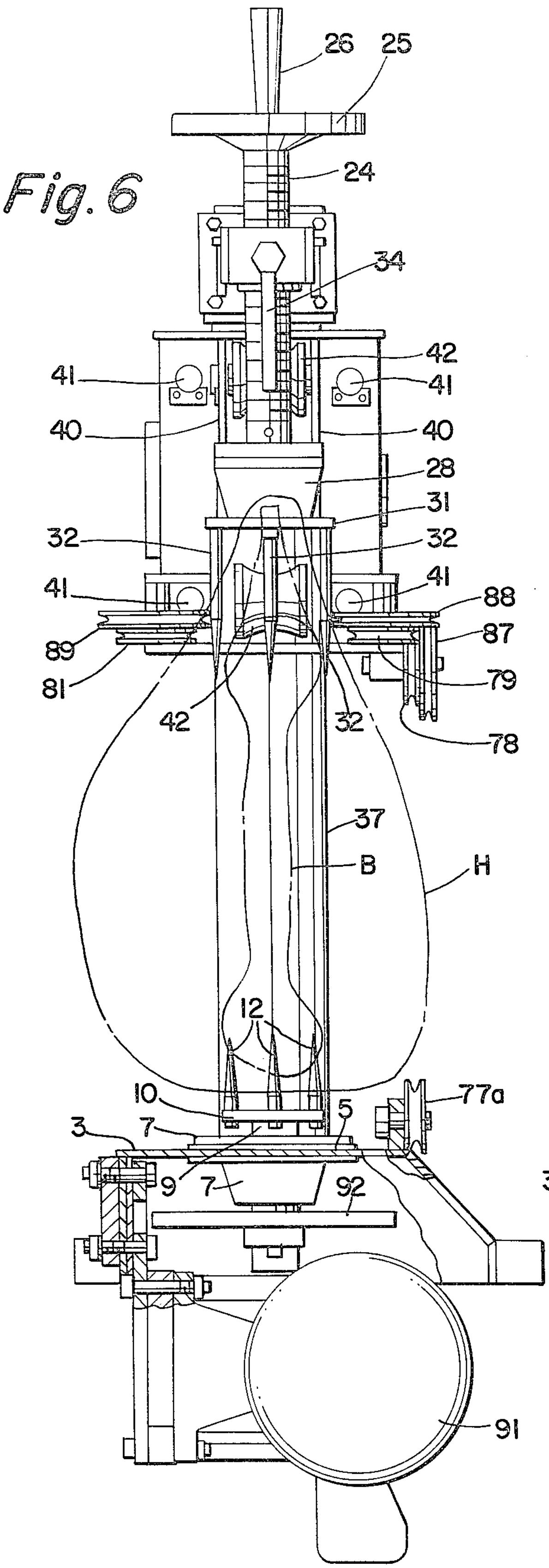
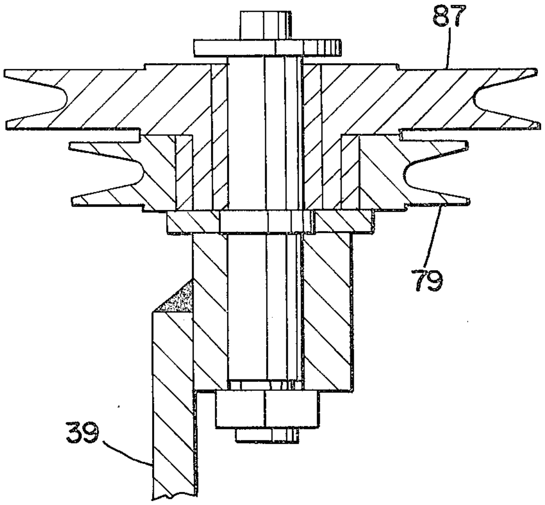
Fig. 12
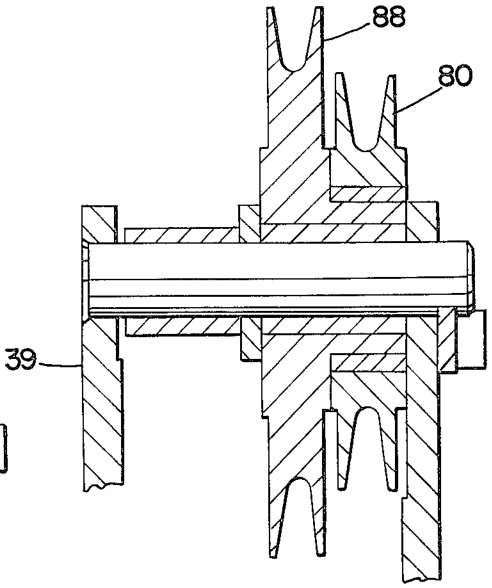
Fig. 13

SPIRAL MEAT SLICER

BACKGROUND OF THE INVENTION

It has heretofore been proposed to form a continuous spiral slice on a piece of meat such as a ham which has a center bone structure which includes a crooked bone of non-uniform diameter.

Such proposals include the Hoenselaar U.S. Pat. No. 2,470,078; the Chesley U.S. Pat. No. 3,153,436 and the Schmidt et al. U.S. Pat. No. 4,050,370.

In each of these patents the ham is mounted on a carriage for rotation about a substantially vertical axis which corresponds to the axis of the bone, and the carriage is moved continuously along said axis. At the same time, a reciprocating knife positioned at an angle other than 90°, with respect to the axis of rotation of the bone, is used for slicing the ham, and as the carriage moves, the knife is advanced along the axis of rotation to form a continuous spiral slice or cut.

SUMMARY OF THE INVENTION

This invention relates, as indicated to a spiral meat slicer, but has reference more particularly to a slicer for slicing a whole ham into a single spiral slice.

The invention has, as its primary object, the provision of a spiral meat slicer for cutting a single continuous spiral slice on a piece of meat, such as a ham, which has a center bone structure and utilizing a rotating circular disklike blade or cutter.

Another object of the invention is to provide a spiral meat slicer of the character described, in which a single electrically-driven motor is utilized to rotate the ham about a vertical axis corresponding substantially to the axis of the center bone structure and to move the blade axially in relation to the axis of the center bone.

A further object of the invention is to provide a spiral meat slicer of the character described in which a cutter unit is used to enclose and guard the rotating blade and has means associated therewith for preventing exposure of the blade when the cutter unit is not in use, whereby injury to the operator of the slicer and other personnel is avoided.

A further object of the invention is to provide a spiral meat slicer of the character described, having incorporated in the structure thereof means for stabilizing the action of the cutter unit, whereby greater efficiency in use of the slicer and an improved product is attained.

A still further object of the invention is to provide a spiral meat slicer of the character described, which consists of a minimum number of parts which can be easily manufactured and assembled at low cost.

Other objects and advantages of the invention will become more apparent in the course of the following description, taken in conjunction with the drawings in which a preferred embodiment is disclosed.

BRIEF DESCRIPTION OF THE DRAWINGS

FIG. 6 is a view, partly in elevation and partly in cross-section, of the drive unit as viewed from the right side of FIG. 5;

FIG. 12 is a fragmentary cross-sectional view taken on the line 12—12 of FIG. 9;

FIG. 13 is a fragmentary cross-sectional view taken on the line 13—13 of FIG. 9;

DESCRIPTION OF A PREFERRED EMBODIMENT OF THE INVENTION

Figure 1:
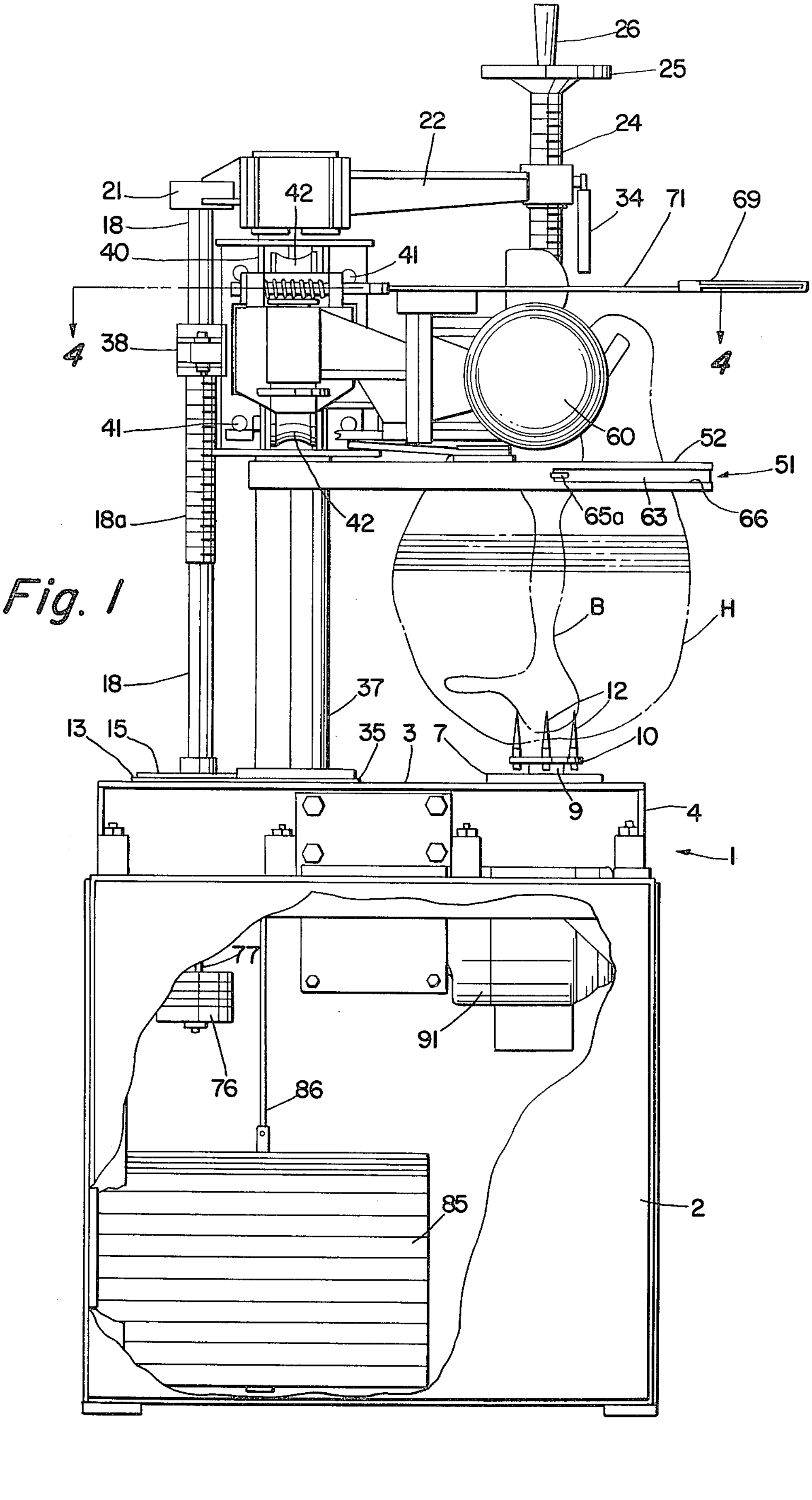
FIG. 1 is a front elevational view of a spiral meat slicer embodying the invention, with a portion thereof broken away to show certain internal structure or parts.
Figure 2:
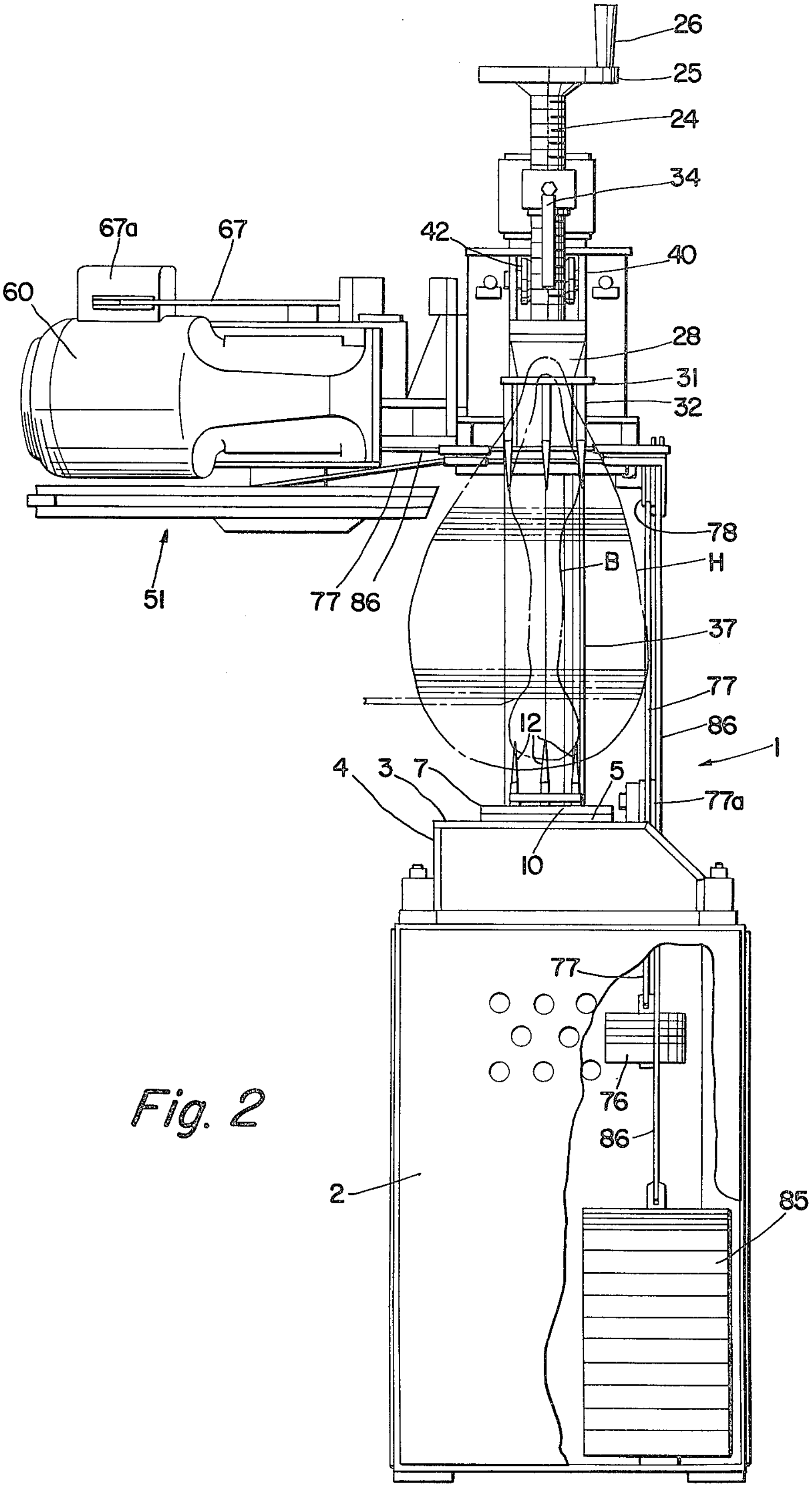
FIG. 2 is an elevational view of the spiral meat slicer, as viewed from the right side of FIG. 1, with a portion thereof broken away to show internal structure or parts.

As best seen in FIGS. 1, 2, 5 and 6, the spiral meat slicer is mounted on a support structure or cabinet 2, which supports the slicing apparatus at a convenient working level.

Secured to the top of the support structure or cabinet 2 is a housing comprising a base 3 and an apron 4.

The base 3 of the housing has welded thereto an annular member 5, to which is secured, as by bolts 6, a bearing retainer 7 in which a roller bearing 8 is mounted.

The bearing 8 has journalled for rotation therein a shaft 9, to the upper end of which a plate 10 is secured, as by a socket head screw 11. The plate 10 has secured therein four circumferentially spaced pins or prongs 12, the function of which will be presently described.

The base 3 of the housing also has welded thereto a member 13, to which is secured, as by bolts 14, a bearing retainer 15, in which a roller bearing 16 is mounted.

The bearing 16 has journalled for rotation therein a shaft 17 which has secured thereto, as by a taper pin *17a*, a shaft 18, an enlarged portion *18a* of which is threaded.

Secured to the upper end of the shaft 18, as by a lock washer 19, is a bearing 20, on which is journalled for rotation thereon a bracket 21, having a bracket arm 22 extending therefrom.

The arm 22 has secured therein a nut 23 to which a threaded shaft 24 is threadedly secured, the shaft 24 having a handwheel 25 secured to its upper end. The handwheel is rotated by means of a handle 26.

The shaft has secured to its lower end, as by a taper pin 27, a bearing retainer 28, in which a bearing 29 is mounted.

Journalled for rotation in the bearing 29 is a shaft 30 to which is secured, as by a bolt *30a*, a fork 31. The fork 31 has secured therein a series of downwardly extending spaced pins or prongs 32, the function of which will be presently described.

The shaft 24 may be rotated in the nut 23 to any desired vertical position, in order to bring the pins or prongs 32 into such proximity or relationship with the pins or prongs 12 as to clamp therebetween a ham, designated by the letter H in FIGS. 1, 2, 3, 4, 5 and 6, the center bone structure which is designated by the letter B.

Following such rotation, the shaft 24 is locked against rotation or axial movement by means of a set screw 33, threadedly secured in the nut 23 and adapted to be actuated by a handle 34.

The base 3 of the housing also has welded therein a member 35 to which is secured, as by bolts 36, a column 37, the function of which will be presently explained.

Mounted on the threaded portion 18*a* of the shaft 18, for movement axially of this column, is a nut 38, which supports a carriage frame 39, the construction of which is best seen in FIGS. 1, 4, 5, 6, 8, 9, 12 and 13.

Referring to these figures, the carriage frame 39 will be seen to comprise a series of vertically-extending angles 40, in which stub shafts 41 are mounted, and upon which circumferentially-spaced rollers 42 are journalled for rotation on bearings 43. The rollers 42 bear against the column 37, as the carriage frame 39 is elevated or lowered, and serves to stabilize the carriage frame in its movement, while at the same time, permitting the carriage frame to be rotated about the column 37.

The carriage frame 39, as best seen in FIGS. 1, 2, 3, 4, 5, 6, 7 and 14, has a bracket 44, provided with an ear 45, to which is secured, as by a bolt 46, a bracket 47. The bracket 47, in turn, has secured thereto, as by a bolt 48 and nut 49, a bracket 50, to which is secured a slicer or cutter unit generally designated by reference numeral 51.

The slicer or cutter unit 51 comprises a hollow circular housing or guard 52, a portion of which is removed, as at 52*a* to provide an opening 53 in the side of the guard, through which a portion of a circular or disk-like knife or blade 54 extends. The knife or blade 54 is secured to a blade housing 55 and a blade housing cover 56 by means of bolts 57 and nuts 58.

The blade housing 55 is keyed to the shaft 59 of an electric motor 60, which is secured to the bracket 44 and drives the blade 54. A cover 61 is secured to the shaft 59 by a bolt 62 and is thus driven with the blade 54.

The slicer or cutter unit 51 further comprises an inner guard or door 63, which is concentric with the blade housing 52, and is rotatable about the axis of the shaft 59 to close the opening 53 in the guard 52.

The inner guard or door 63, is provided with an arm 64 upon which is rotatably mounted a follower roller 65, which is adapted to bear against the periphery of the ham H, for the purpose of maintaining the door 63 in open position during the slicing operation.

Figure 3:
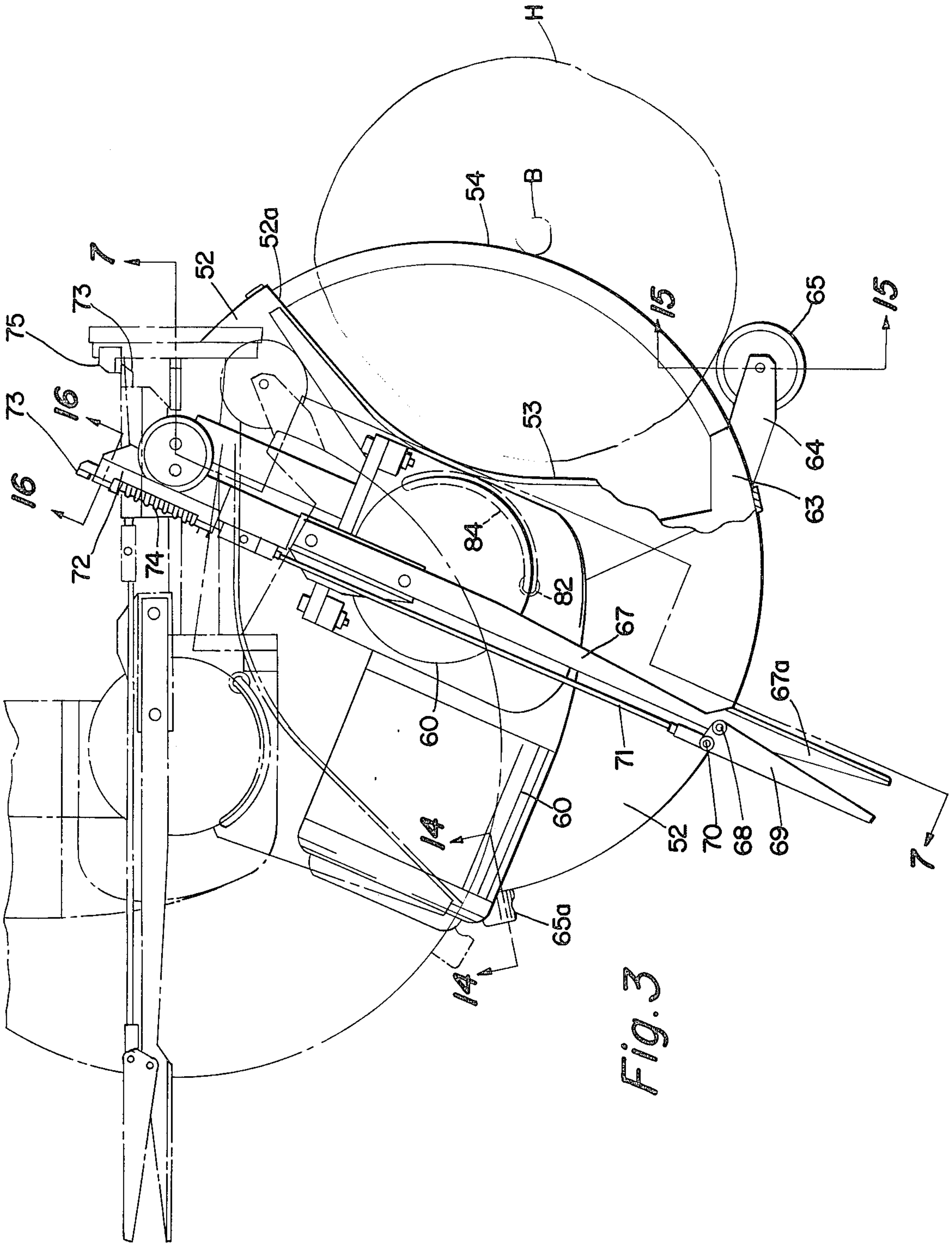
FIG. 3 is a plan view of the cutter unit of the spiral meat slicer.
Figure 14:
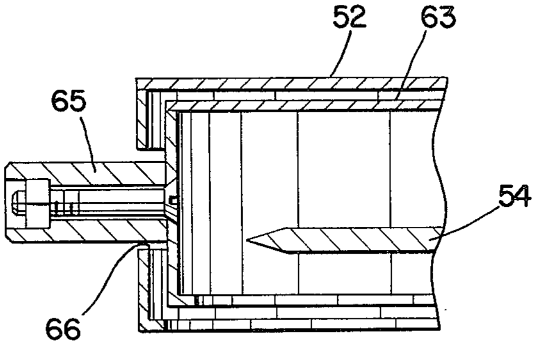
FIG. 14 is a fragmentary cross-sectional view taken on the line 14—14 of FIG. 3.
Figure 15:
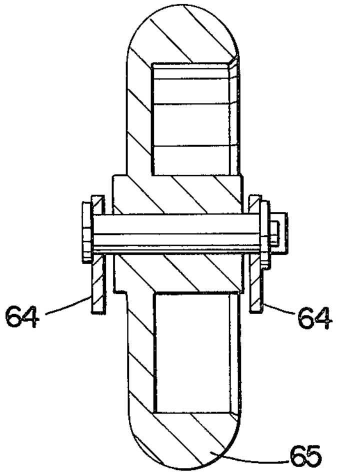
FIG. 15 is a fragmentary cross-sectional view taken on the line 15—15 of FIG. 3.
Figure 16:
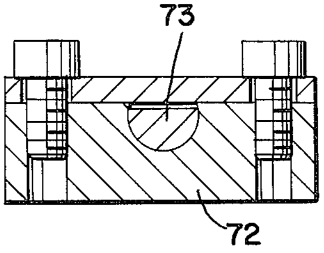
FIG. 16 is a fragmentary cross-sectional view taken on the line 16—16 of FIG. 3.

In order to permit the door 63 to be opened, so as to permit the blade 54 to be exposed when the cutter unit is in use, the door 63 is as best seen in FIGS. 1 and 3 and 14, provided with a handle 65*a* which projects radially from the door 63 and is movable manually in a slot 66 in the side of the outer guard 52.

For the purpose of manually moving the cutter blade against the ham to be sliced, an actuating arm 67 is provided which is best seen in FIGS. 1, 2, 3, 4 and 7.

The arm 67 is rigidly secured to the carriage frame 39 and extends substantially across the axis of the cutter unit.

The arm 67 has a handle portion 67*a,* to which is pivotally secured, as at 68, a lever 69, which in turn is pivotally secured, as at 70, to a rod 71. The rod 71 is mounted for reciprocal movement in a bracket 72, which is attached to the arm 67, and the rod is provided at its end with a detent 73, the purpose of which will be presently explained.

Figure 4:
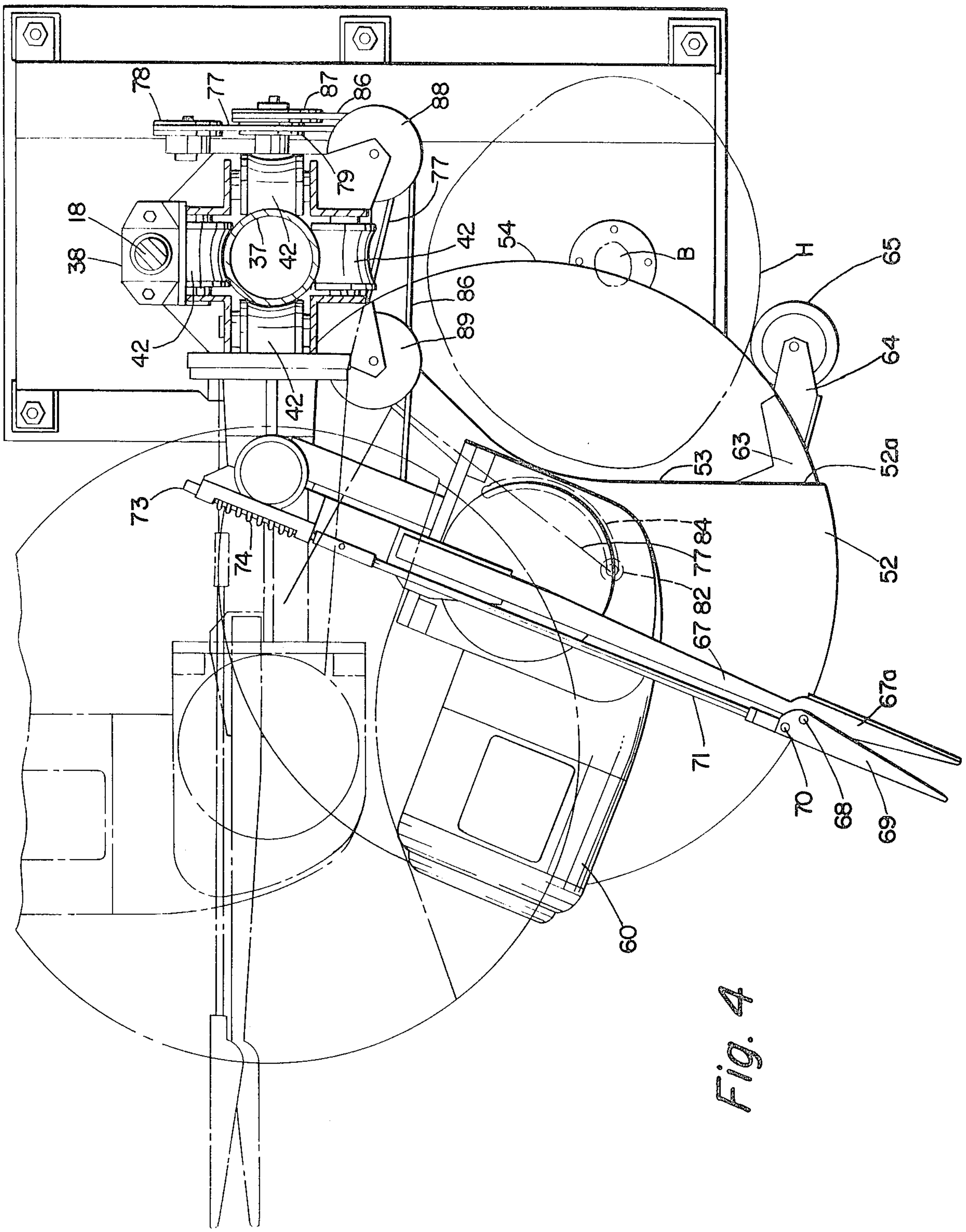
FIG. 4 is a cross-sectional view, taken on the line 4—4 of FIG. 1.
Figure 5:
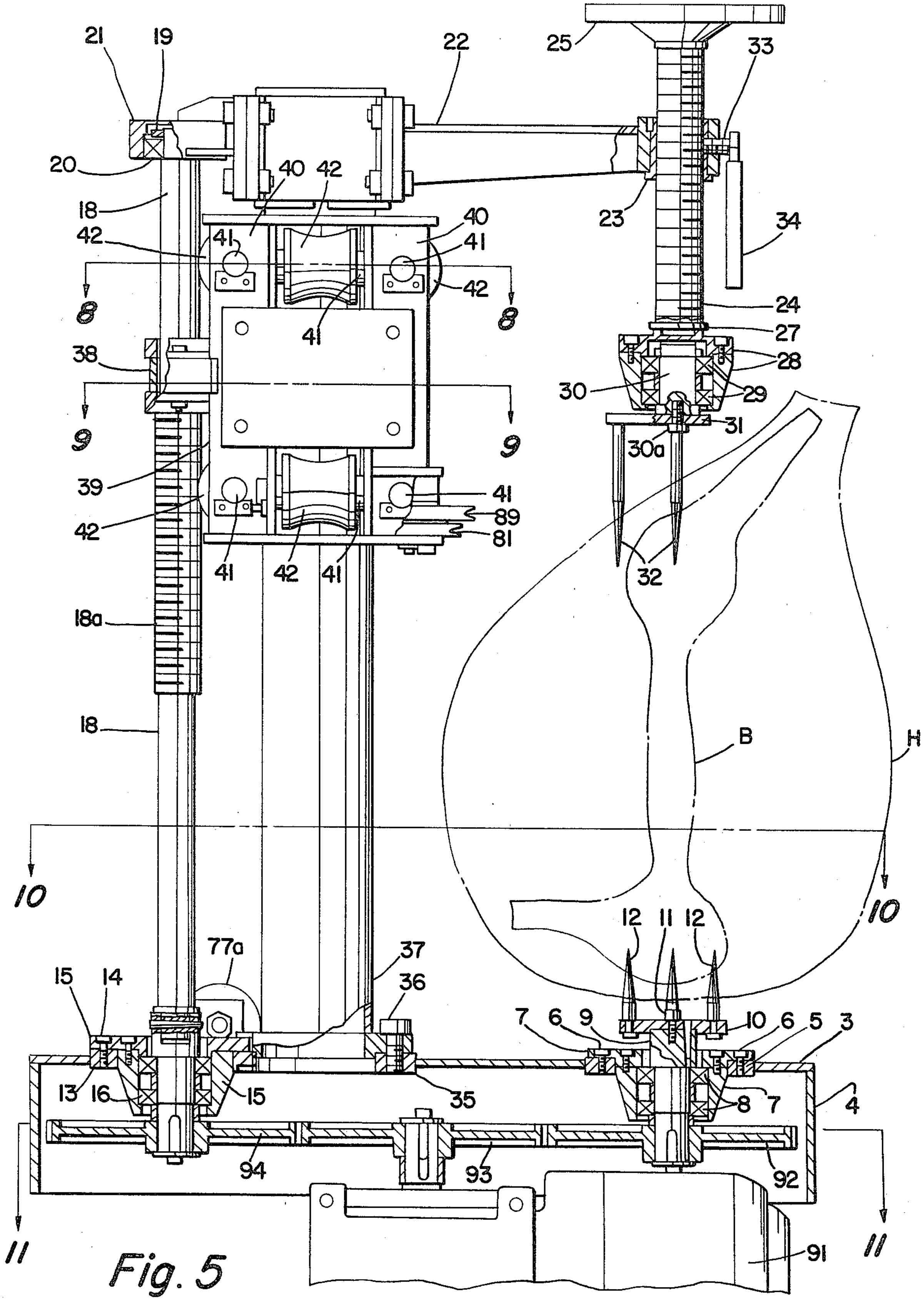
FIG. 5 is a view, partly in elevation and partly in cross-section, of the drive unit.

The rod 71 is normally maintained in an operative position, as seen in solid lines in FIGS. 3 and 4, by means of a compression coil spring 74.

After the slicing operation has been completed, and the arm 67 moved to the position shown in broken lines in FIGS. 3 and 4, the detent 73 is cammed by a latch 75 on the carriage frame 39 into the position shown in broken lines in FIG. 3, in which position the arm is latched against counterclockwise movement as viewed in FIG. 3. The expansion of the spring 74 acts to maintain the arm in such position.

The detent 73 is released by hand pressure of the lever 69 against the handle 67*a,* which causes the detent to be retracted from the latch 75, and permits the arm 67 to be moved in a counterclockwise direction to bring the slicing or cutter unit against the ham H.

For the purpose of maintaining the door 63 in closed position, at such time when the apparatus is not being used, and thus avoid exposure of the cutting blade to cause possible injury to the operator, a weight 76 is employed, which is best shown in FIGS. 1, 2, 5 and 6.

The weight 76 is connected to a cable 77 which is guided by a sheave or pulley 77*a,* mounted on the base 3. The cable 77 passes over a pulley or sheave 78 (FIG. 4) mounted on the carriage frame 39, then over a second pulley or sheave 79 (FIGS. 4 and 9) mounted on the frame 39, then over a third sheave or pulley 80 (FIG. 9) mounted on the frame 39, and then over a fourth sheave or pulley 81 (FIGS. 9 and 13) mounted on the frame 39, and is connected, as at 82 (FIG. 7) to a pin 83, which is secured to the inner guard or door 63 and is movable in an arcuate slot 84 (see FIGS. 3 and 4) in the guard 52.

In the course of movement of the cutter unit 51 from the inoperative position shown in broken lines in FIGS. 3 and 4 to the operative position shown in solid lines, the follower roller 65 engages the peripheral surface of the ham H, and is cammed by such surface to cause the inner guard or door 63 to be opened, thereby permitting the blade 54 to cut into the ham. In the course of this movement, the weight 76 is lifted by the cable 77 to the position approximately shown in FIGS. 1 and 2.

For the purpose of counterbalancing the weight of the cutter unit, a weight 85 is provided, which is best shown in FIGS. 1, 2, 5, 6, 9, 12 and 13.

Figure 7:
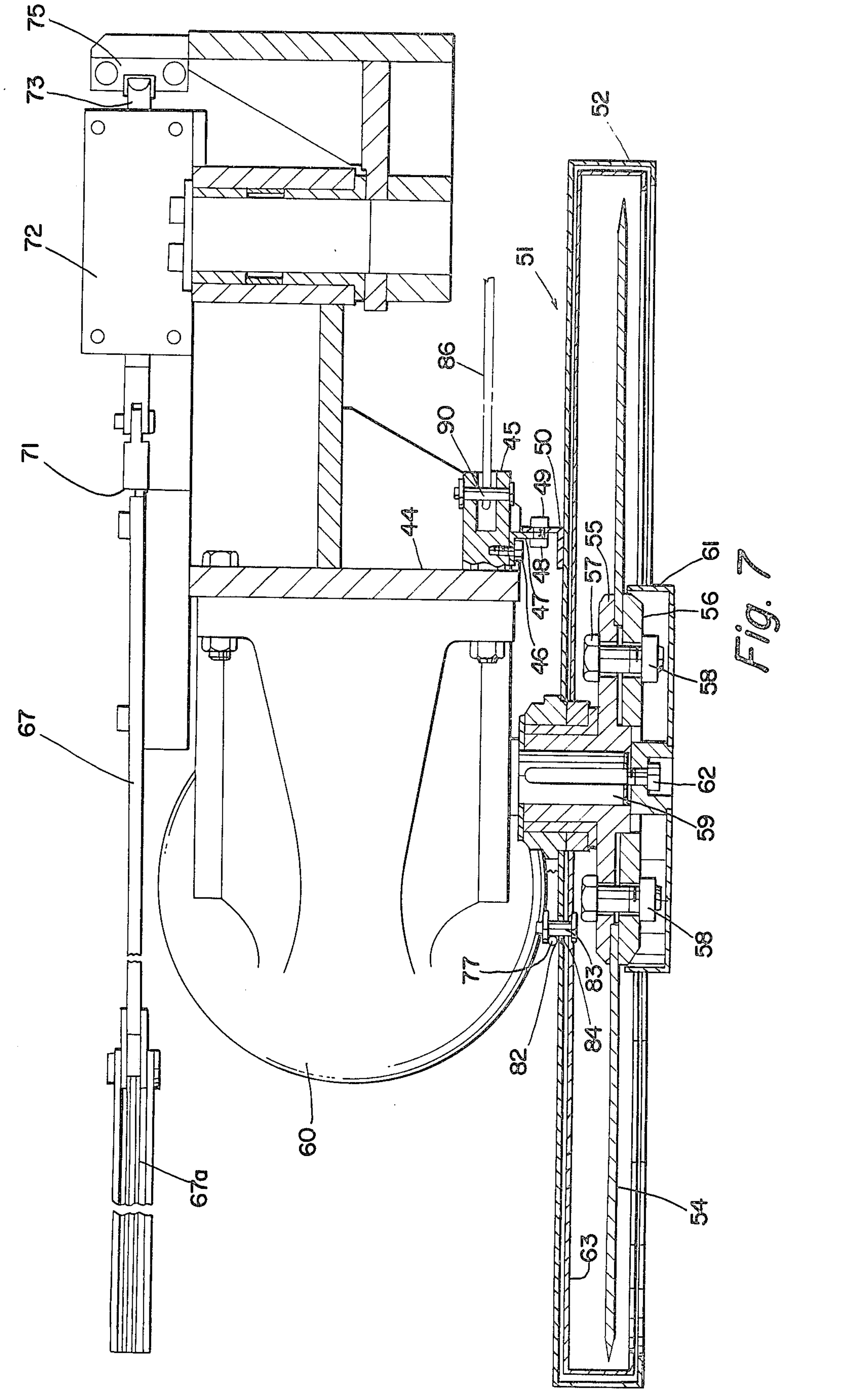
FIG. 7 is a view, partly in elevation and partly in cross-section, of the cutter unit taken on the line 7—7 of FIG. 3.
Figure 8:
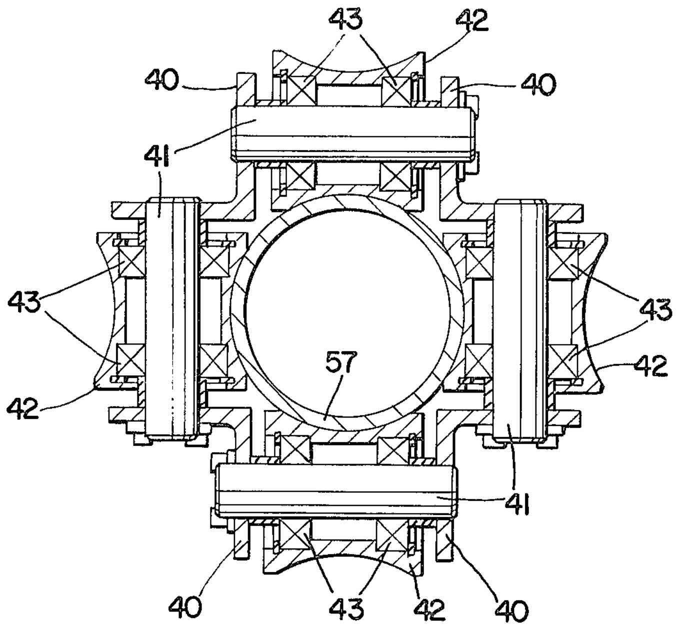
FIG. 8 is a fragmentary cross-sectional view taken on the line 8—8 of FIG. 5.
Figure 9:
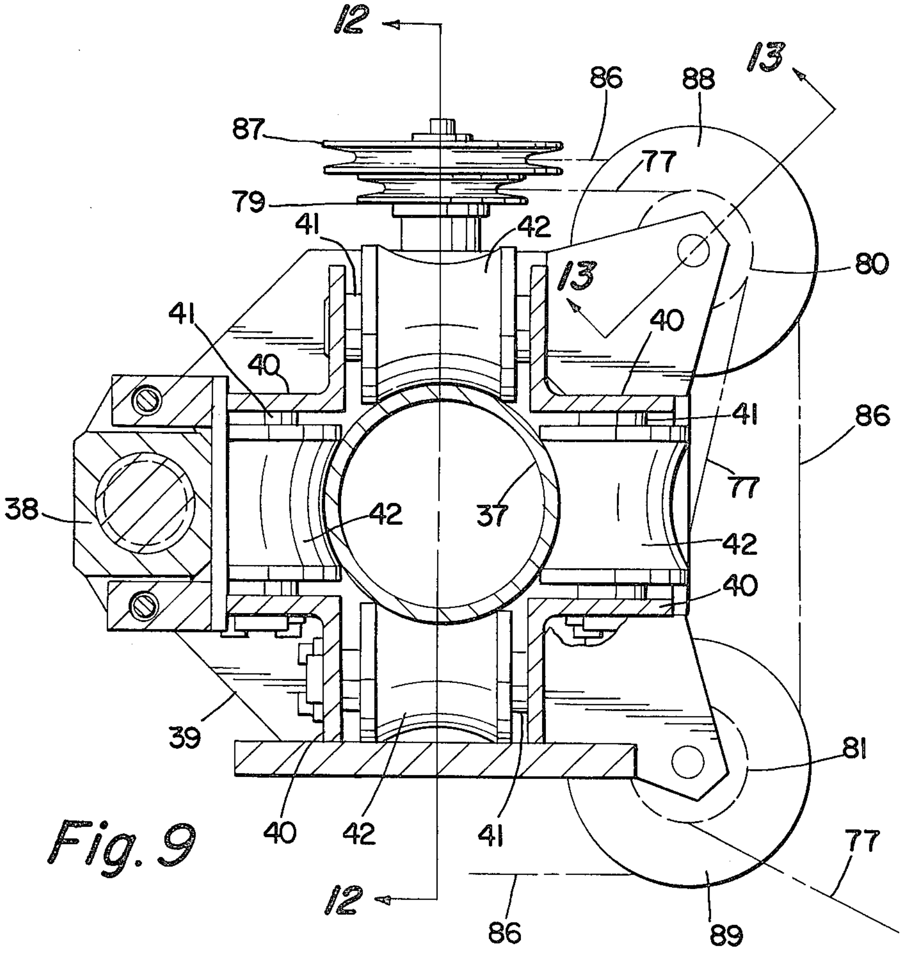
FIG. 9 is a fragmentary cross-sectional view taken on the line 9—9 of FIG. 5.
Figure 10:
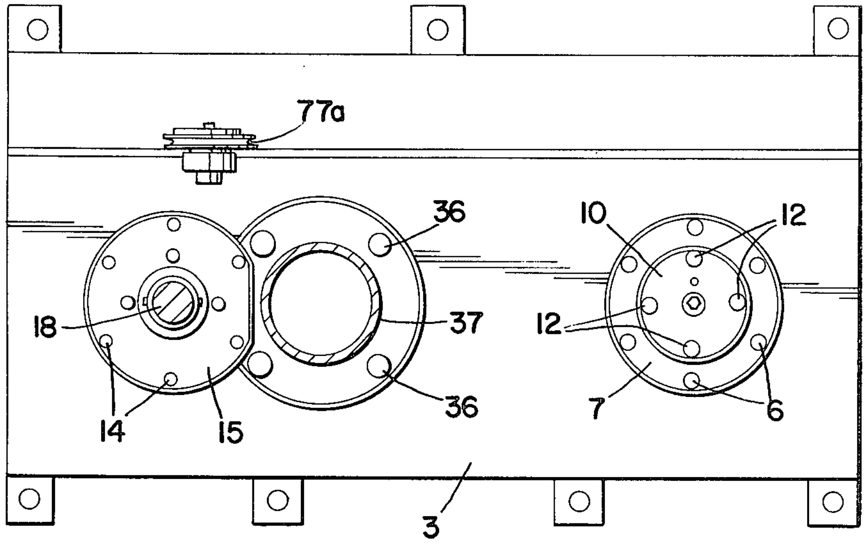
FIG. 10 is a cross-sectional view taken on the line 10—10 of FIG. 5.

The weight 85 is connected to a cable 86, which passes over a pulley or sheave 87 (FIG. 4) mounted on the carriage frame 39, then over a second pulley or sheave 88 (FIGS. 4, 6 and 9) mounted on the carriage frame 39 and over a third pulley or sheave 89 mounted on the carriage frame 39, and is connected, as shown in FIG. 7, to a pin 90, mounted in the ear 45 of the bracket 44.

In the course of movement of the cutter unit from the inoperative position shown in broken lines in FIGS. 3 and 4 to the operative position shown in solid lines, the weight 85 is lifted and serves to stabilize the cutter unit as it is being manipulated.

The ham H is rotated about its vertical axis, that is to say, about the axis which is substantially that of the bone B by a reversible electric motor 91 (FIGS. 1, 2) which drives the shaft 9.

Figure 11:
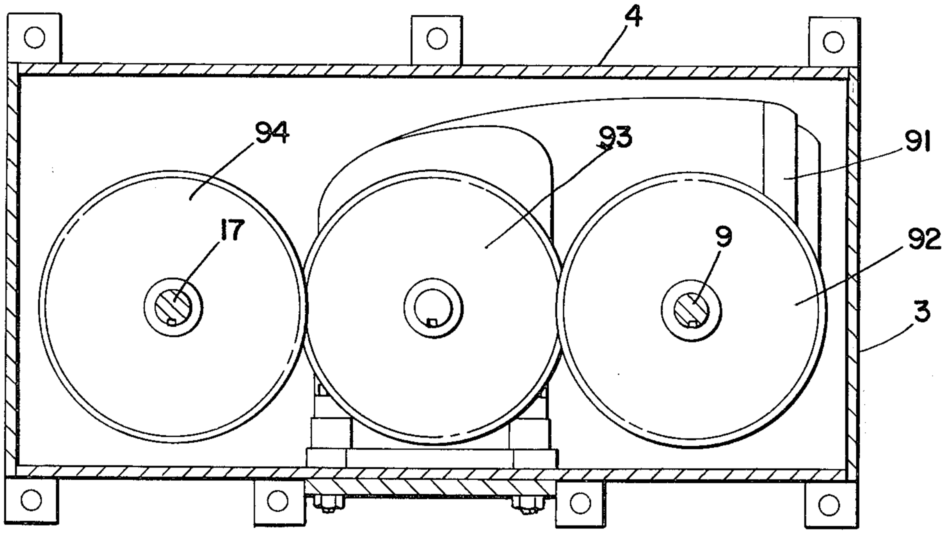
FIG. 11 is a cross-sectional view taken on the line 11—11 of FIG. 5.

The shaft is keyed to a spur gear 92 (FIGS. 5 and 11) which through an idler gear 93, drives a spur gear 94 in the same direction as the gear 92. The gear 94 rotates the column or shaft 18, so as to cause the nut 38 to be moved by the threaded portion 18*a* of the shaft 18 up or down, depending on the direction of rotation of the shaft, thereby causing the carriage frame 39 and the cutter unit 51 to be moved therewith.

OPERATION OF THE SPIRAL MEAT SLICER

With the cutter unit in the latched position shown in broken lines in FIGS. 3 and 4, the set screw 33 is released from contact with the shaft 24 by means of the handle 34.

The shaft 24 is then elevated by means of the handle 26 to a position in which sufficient space is provided for reception of the ham H in the position approximately shown in FIGS. 1, 2, 3, 4, 5 and 6, and placement of the ham on the pins or prongs 12, so that these pins or prongs penetrate the bone B.

The shaft 24 is then moved downwardly by means of the handle 26 to cause the pins 32 to penetrate the bone, and thereby cause the ham to be securely clamped in a position ready to be sliced.

The cutter unit 51 is then released from its latched or inoperative position, and moved by the operator by means of the handle 67*a* in a counterclockwise direction towards the ham, as indicated in FIGS. 3 and 4, whereupon the motor 91 is energized to rotate the ham, and at the same time, the shaft 18 is rotated to cause the cutter unit 51 to be moved vertically in relation to the ham.

The motor 60 is then energized to cause the blade 54 to be rotated about the axis of the shaft 59 to slice the ham as the ham is being rotated.

The axis of rotation of the shaft 59 is canted slightly in relation to the axis of rotation of the ham, so as to produce a single continuous spiral slice or cut.

Following the aforesaid operation, the cutter unit is returned to its latched or inoperative position, the ham is unclamped and removed from the apparatus and is ready to be served.

As the cutter unit is brought toward the ham to be sliced, the follower roller 65 is cammed by the peripheral surface of the ham to cause the inner guard or door 63 to be opened, to expose the blade 54 for cutting or slicing into the ham, and when the slicing has been completed, the weight 76 will descend by gravity to cause the door 63 to close, thereby eliminating the danger of injury to the operator.

As the cutter unit is moved toward the ham, the weight 85 is lifted and acts to stabilize the movement of the cutter blade, so that when the blade approaches or comes into contact with the bone B of the ham, the operator will feel a slight vibration in his hand, which enables him to control the blade movement to an extent such as to avoid the possibility of cutting into or through the bone.

It is to be understood that changes may be made in the apparatus which has been described, without departing from the spirit of the invention or the scope of the subjoined claims.

Having thus described my invention, I claim:

1. In a spiral meat slicer of the character described, means for mounting a whole ham having a central bone structure in a substantially vertical position, means for rotating said ham about the axis of said bone structure, a slicer or cutter unit, means for moving said cutter unit vertically relatively to the ham, said unit comprising: a carriage frame, a circular cutting blade, means for rotating said blade, a hollow circular housing or guard in which said blade is enclosed, a portion of said circular housing or guard being removed to provide an opening in the side of the guard through which a portion of said cutting blade projects, an inner guard or door which is concentric with said housing and is rotatable within said housing to close said opening in the guard to avoid exposure of said blade through said opening, a handle for moving said inner guard manually to expose said blade through said opening when the cutter unit is in use and to close said opening when the cutter unit is not in use, means for maintaining said inner guard or door closed, when the cutter unit is not in use, said last-named means comprising a gravity-actuated weight operatively connected to said inner guard or door and an arm on said inner guard or door having a follower roll mounted thereon, said follower roll bears against the periphery of the ham for the purpose of maintaining the inner guard or door open during the slicing operation.

2. A spiral meat slicer as defined in claim 1 including means for manually moving said cutter unit toward and away from said ham, said last-named means comprising an arm rigidly secured to said carriage frame and extending substantially across the axis of the cutter unit, and means for locking said arm against movement toward said ham, comprising a detent, a latch for receiving said detent, and spring-biased means for urging said detent into said latch and including a lever pivotally secured to said last-named arm, and manually movable toward said arm to release said detent from locking engagement with said latch.

3. A spiral meat slicer as defined in claim 1 including stabilizing means comprising: a gravity-actuated weight liftable in response to movement of said cutter blade toward said ham, said weight acting to stabilize the movement of the cutter blade, and to counterbalance the weight of the cutter unit, said spiral meat slicer including in addition, a rotatable shaft, a stationary column, said carriage frame being movable vertically in response to rotation of said shaft, said frame comprising rollers spaced circumferentially about said shaft and rollable vertically along the exterior of said column, said rollers being also movable circumferentially about said column, said rollers serving to stabilize the carriage frame in its movement, while, at the same time, permitting the carriage frame to be rotated about said column.

4. In a spiral meat slicer of the character described, means for mounting a whole ham having a central bone structure, means for rotating said ham about the axis of said bone structure, a circular cutting blade, means for rotating said blade about an axis inclined to the axis of said bone structure, means for simultaneously moving said rotating blade relatively to the axis of said bone structure, means for manually moving said blade toward and away from the mounted ham, means for latching said manually movable means in inoperative position, a cutter unit for housing said rotating circular blade, said unit having an opening for exposing the blade for cutting action, means for automatically closing said opening when said blade is not in use, means responsive to engagement by the peripheral surface of said ham for opening said opening to expose the blade for cutting action, a carriage for supporting the cutter unit and associated structure, means for counterbalancing the weight of said carriage, said counterbalancing means including a weight and a cable supporting said weight, said closing means including a weight and a cable supporting said weight, said latching means including a latch mounted on said carriage and a detent engageable by said latch, and lever means for releasing said detent from latched position.

* * * * *